(12) United States Patent
Brockmann

(10) Patent No.: US 8,074,492 B2
(45) Date of Patent: Dec. 13, 2011

(54) METHOD AND APPARATUS FOR THE DETECTION OF LEAKS

(76) Inventor: Robert Brockmann, Greifswald (DE)

( * ) Notice: Subject to any disclaimer, the term of this patent is extended or adjusted under 35 U.S.C. 154(b) by 610 days.

(21) Appl. No.: 12/296,361

(22) PCT Filed: Apr. 4, 2007

(86) PCT No.: PCT/EP2007/003064
§ 371 (c)(1),
(2), (4) Date: Oct. 7, 2008

(87) PCT Pub. No.: WO2007/118615
PCT Pub. Date: Oct. 25, 2007

(65) Prior Publication Data
US 2009/0173136 A1    Jul. 9, 2009

(30) Foreign Application Priority Data

Apr. 10, 2006 (DE) .................. 10 2006 016 747

(51) Int. Cl.
*G01M 3/20* (2006.01)
*G01M 3/02* (2006.01)
*G01M 3/22* (2006.01)

(52) U.S. Cl. ............... 73/40.7; 73/1.02; 73/1.05; 73/40

(58) Field of Classification Search .......... 73/1.02–1.03, 73/1.05–1.06, 1.36, 40, 40.7
See application file for complete search history.

(56) References Cited

U.S. PATENT DOCUMENTS

| 3,729,983 | A | * | 5/1973 | Coppens | 73/40.7 |
| 5,398,543 | A | * | 3/1995 | Fukushima et al. | 73/40.7 |
| 5,676,736 | A | * | 10/1997 | Crozel | 95/45 |
| 6,098,449 | A | | 8/2000 | Knoblach et al. | |
| 7,168,287 | B2 | * | 1/2007 | Rolff | 73/1.05 |
| 7,299,681 | B2 | * | 11/2007 | Cummings | 73/40 |
| 2002/0157446 | A1 | * | 10/2002 | Dilger | 73/1.02 |
| 2005/0178188 | A1 | * | 8/2005 | Shaw | 73/37 |

(Continued)

FOREIGN PATENT DOCUMENTS
DE    2009197 A * 9/1971

(Continued)

OTHER PUBLICATIONS

International Search Report for PCT/EP2007/003064, mailed Dec. 3, 2007.

*Primary Examiner* — Thomas P Noland
(74) *Attorney, Agent, or Firm* — Caesar, Rivise, Bernstein, Cohen & Pokotilow, Ltd.

(57) ABSTRACT

Disclosed is a method for detecting a leak gas in a flushing device (10), comprising the following steps: the flushing device (10) is disposed on a part (201) that is to be tested; a flushing gas is conducted through the flushing device (10); and the leak gas is detected in the flushing gas that is discharged from the flushing device (10) with the aid of a detector device (30). In order to conduct the flushing gas through the flushing device (10), a predetermined main flushing gas flow (QH) is generated, and said main flow (QH) is separated into a system flow (QS) and a partial flow (QT) on a dividing device (40), the system flow (QS) being fed into the flushing device (10). Also disclosed is a leak testing apparatus (100) for detecting a leak gas in a flushing device (10).

37 Claims, 6 Drawing Sheets

U.S. PATENT DOCUMENTS

| | | | |
|---|---|---|---|
| 2007/0000308 A1* | 1/2007 | Weissgerber | 73/40 |
| 2007/0207355 A1* | 9/2007 | Yoshida | 429/25 |
| 2011/0132076 A1* | 6/2011 | Brockmann | 73/40.7 |

FOREIGN PATENT DOCUMENTS

| | | | |
|---|---|---|---|
| DE | 19755794 A1 | 7/1999 | |
| DE | 10306245 A1 | 8/2004 | |
| DE | 10316332 A1 | 11/2004 | |
| EP | 0852712 | 4/1997 | |
| EP | 1693665 A1 * | 8/2006 | |
| JP | 56142437 A * | 11/1981 | 73/40.7 |
| JP | 11148430 A * | 6/1999 | |
| JP | 2004278409 A * | 10/2004 | |
| JP | 2006086025 A * | 3/2006 | |
| WO | 9713134 A1 | 4/1997 | |
| WO | WO 03/056686 A2 * | 7/2003 | |

* cited by examiner

METHOD AND APPARATUS FOR THE DETECTION OF LEAKS

BACKGROUND OF THE INVENTION

The invention relates to a method for leak testing, in particular for detecting a leak gas, for example, in a vacuum device, using a flushing gas method. The invention also relates to a leak detection apparatus for carrying out the method.

In research and industrial technology, many uses are made of vacuum devices. Depending on the particular operating conditions, certain requirements are set for keeping up the vacuum in the vacuum device. The ingress of gases into the vacuum device from the surroundings due to leaks has to be prevented as far as possible. For example, in vacuum devices for plasma research, it is a requirement that all components have a leak rate at all operating temperatures of less than $10^{-10}$ Pa m$^3$/s. Searching for leaks represents a challenge also in the context of other technical fields, for example, in chemical plants or combustion plants in the prevention, for example, of the undesirable escape of a gas into the surroundings.

Known methods for leak detection are, in particular, the vacuum method, the positive pressure method and the sniff testing method. A disadvantage of the vacuum method is that a vacuum chamber adapted to the geometry of the component to be tested must be available. With complex vacuum equipment, this results in an extremely high testing cost. A disadvantage of the positive pressure method and of the sniff testing method is the substantially time-consuming nature of these methods. In addition, the detection limits of these methods have previously been in the range of $10^{-5}$ to $10^{-7}$ Pa m$^3$/s and therefore significantly above the aforementioned required leak rate. A further disadvantage of conventional sniff testing lies therein that detection of leaks from components that are cooled to the temperature of liquid nitrogen has not previously been possible with such methods.

The locating of leaks with the sniff testing method or the positive pressure method is difficult or even impossible where equipment is of complex construction. Therefore, a flushing gas method has been developed for leak detection. An example of the use of the flushing gas method is described in DE 103 06 245. A local gas space in which a flushing gas is situated is provided round a component to be tested. The local gas space in which the flushing gas is situated is tested for traces of a leak gas that has been placed in the interior of the component. The search for the leak gas is carried out, for example, as it is with sniff testing, using a mass spectrometer. In the case of the method described in DE 103 06 245, ambient air is drawn into the housing as the flushing gas. However, due to the inadequate purity of the ambient air, this method is unsuitable for leak detection in the case of the extremely low detection limits required, for example, with vacuum equipments.

From the presentation at the DGZfP annual conference entitled "Non-destructive material testing", 21-23 May 2001 in Berlin (report vol. 75) and the DIN ISO 15848-1 standard which is based thereon, a variant of the flushing gas method is known wherein it is not ambient air but rather a flushing gas from a flushing gas source that is used for the flushing. With this method, which is illustrated schematically in FIG. 17, a leak detection apparatus 100' comprises a flushing device 10' on a component 201' to be tested, a gas feed device 20' with which the flushing gas can be introduced into the flushing device 10', and a detector device 30' for detecting leak gas in the flushing gas which emerges from the flushing device 10'.

The gas feed device 20' comprises a flushing gas source 23', a pressure regulator 24', a flow control system 25' and a flow measurement device 26'. By means of the gas feed device 20', a specific system flow of the flushing gas which is introduced into the flushing device 10' (see arrow) is generated under the action of an excess pressure set and monitored with the components 24' to 26'.

In order to be able to carry out a precise and reproducible measurement with the detector 31' of the detector device 30', when the system flow is adjusted, the following requirements must be met. A constant positive pressure must be maintained in the flushing device 10'. The system flow must be adjusted so as to compensate for the pressure loss arising from the outflow of flushing gas to the detector device 30'. One problem consists therein that this pressure loss is not constant in practice. As a result of temperature changes, shape changes of the flushing device 10' which is formed e.g. as a flexible covering, or the piercing of a probe of the detector device 30' into the flushing device 10', pressure variations which directly impair the measuring result from the detector 31' can occur.

Furthermore, with the conventional methods, in order to avoid reverse diffusion of ambient air via the detector device 30' into the flushing device 10', a relatively large system flow is needed. This is disadvantageous with large pressure variations in the flushing device 10' and is therefore associated with a worsening in the detection limit for leak gas detection.

The conventional method as illustrated in FIG. 17 therefore suffers from the disadvantage that the stated requirements placed on the leak detection can only be fulfilled with difficulty and adjustment of the system flow of the flushing gas is only possible to a limited degree of accuracy.

It is an objective of the invention to provide an improved method for leak testing by means of which the disadvantages of the conventional methods are overcome and which is characterized, in particular, by more stable adjustment of a flushing gas flow, an improved detection limit for the leak gas detection, and increased testing speed. Furthermore, the method should be capable of being carried out with a high degree of flexibility under various operating conditions and of being automated. It is a further objective of the invention to provide an improved leak detection device, with which the disadvantages of the conventional leak detection devices can be overcome and which enables leak detection with an improved detection limit and at increased speed.

These objectives are achieved with methods and devices of the invention.

SUMMARY OF THE INVENTION

Relating to the method, the invention is based on the general technical teaching that, for leak detection, a pure flushing gas is conducted under negative pressure which is generated on the detector side, through a flushing device to a part to be tested, for example, a vacuum device, wherein the flushing gas conducted through the flushing device is diverted from a main flow. According to the invention, a predetermined, possibly adjustable main flow of the leak-free or test gas-free flushing gas is generated and is divided into a system flow for passing through a flushing chamber of the flushing device and a partial flow for diverting, for example, into the surroundings or into a regeneration vessel. The system flow fed into the flushing chamber corresponds exactly to the detector flow drawn off by the detector. If leak gas or test gas enters the flushing device from the part being tested, this can be detected by the detector.

If, as a result of particular operating conditions, the pressure in the flushing chamber varies, this leads at the same time to a corresponding change in the system flow that is fed in. The feeding in of the system flow is therefore also designated 'tracking'. Any pressure variations are advantageously equalized automatically, so that the problems of conventional methods in relation to the stability of the gas stream fed through the flushing device are avoided. This achieves a raised level of accuracy and reproducibility in the detection of the leak gas which may be contained in the flushing gas emerging from the flushing device.

In contrast to the conventional method, the volume flow rate of the flushing gas through the flushing device is not adjusted by flow regulation or pressure regulation on the inlet side, but by the pressure in the flushing device with the aforementioned division of the main flow. At least during the leak testing, the system can be sealed from the surroundings on the detector side. Advantageously, the pressure in the flushing device can be adjusted such that only the volume flow of flushing gas needed by the respective leak gas detector for leak gas detection is diverted from the divided main flow. An increased volume flow rate in order to avoid back-diffusion from the surroundings, as required in the conventional method, can thus be avoided. Advantageously, therefore, the flushing gas usage is reduced and the accuracy of the setting of the system flow is increased.

Advantageously, according to the invention, only a small volume flow rate value is set and this can be achieved with increased accuracy and stability. By setting the partial flow, the pressure in a gas space on a part to be tested, for example, a vacuum device, can be set with a high level of accuracy. Advantageously, faults, for example due to incompletely hermetically sealed coverings used to form the gas space or due to volume changes, can be compensated for.

The partial flow control system according to the invention also enables, by means of the system flow of flushing gas which is fed into the gas space, the very pressure loss caused by the diversion of flushing gas to a detector device and by any leaks to be compensated for. The concentration of the leak gas is detected, not in a flushing gas flow coming off from the gas space, but in a probe flow. It is only the pressure difference between the gas space and the surroundings where, for example, atmospheric pressure prevails, that must be maintained with the partial flow control system.

With regard to the device, the aforementioned objective is solved accordingly with a leak detection apparatus, wherein a gas feed device is equipped, for passing a flushing gas through the flushing device to a component to be tested, with a dividing device for dividing a main flow into a system flow and a partial flow. The system flow is diverted from the main flow and is fed into the flushing device. The volume flow rate fed in corresponds to the volume flow rate which is drawn off by a device, for example, the detector device or a suction pump on the outlet side of the flushing device.

An important advantage of the invention lies therein that the leak detection device can be used with the gas feed device and the detector device for reliable leak detection in the various types of flushing devices. Using the partial flow method according to the invention, the pressure in the gas space of the flushing device can be adjusted in any event with a high degree of accuracy. The gas space can be surrounded, for example, with a flexible shell or housing with fixed walls.

If, according to a preferred embodiment of the invention, the dividing device comprises a three-way branch (three-way connection), a particularly simple structure of the gas feed device is provided. The main flow is fed through one branch of the three-way connection, whilst the partial flow and the system flow are diverted through the other two branches. Advantageously, there is no limit with regard to the geometrical arrangement of the branches relative to one another. For example, the three-way connection at which a main flow and a system flow are divided comprises a T-piece.

According to a preferred variant, the three-way connection comprises a partial flow chamber to which the main flow line, the system flow line and the partial flow line are connected. In the partial flow chamber, a buffer chamber is advantageously provided, into which the main flow is fed and from which the partial flow and the system flow are diverted. Advantageously, this enables an oscillation-free and constant feeding of the detector stream drawn off. This effect can be further improved if a throttle device, for example, a porous filter insert or a throttle diaphragm is provided in the partial flow chamber at the branch of the system flow line, in order to equalize any pressure variations in the setting of the main flow.

According to a preferred embodiment of the leak detection method according to the invention, adjustment of the partial flow is provided, so that the partial flow has a pre-determined volume flow rate. Advantageously, a pre-determined operating pressure can be thereby set in the flushing device.

According to a preferred embodiment of the invention, adjustment of the partial flow is carried out in that a pre-determined flow resistance is provided in the partial flow line through which the partial flow is diverted. Advantageously, simply by means of setting the flow resistance in the partial flow line, the partial flow of the flushing gas can be set to the desired value. A further advantage of setting the flow resistance lies in the variability of different measures which can be provided individually or in combination for adjusting the partial flow. If, for example, a partial flow line with a pre-determined diameter is used in order to generate a desired flow resistance, the design of the partial flow control system is substantially simplified. The partial flow device can comprise the T-piece alone, its branch for diverting the partial flow having the suitably selected diameter. A similar principle applies if, according to a variant, a partial flow line with a particular length is used for adjusting the flow resistance. If the flow resistance is adjusted with a partial flow adjusting device, for example, a dosing valve in the partial flow line, advantages for the accuracy and variability of the partial flow setting can result. If the partial flow adjusting device is manually actuated, the design of the gas feed device according to the invention is advantageously simplified thereby. If the partial flow adjusting device is electrically actuated and, for example, comprises a solenoid valve, control of the partial flow adjusting device is advantageously simplified. Alternatively, adjustment of the partial flow adjusting device can be provided with a differential pressure manometer. The pressure difference in the partial flow line relative to the surroundings can be used as a measure of the pressure difference in the flushing device compared with the surroundings. If the outflow of flushing gas from the flushing device increases and consequently the pressure in the flushing device falls, the pressure in the partial flow line also falls accordingly. As soon as the differential pressure manometer detects that a pre-determined pressure difference has been undershot, the partial flow adjusting device can be actuated. By means of stepped closing of the partial flow adjusting device, the flow resistance in the partial flow line can be increased and thereby the pressure in the flushing device can be increased.

When a fixed partial flow is adjusted, for example, by means of the flow resistance in the partial flow line, the relevant setting can be checked with the following test. A free end of the partial branch, for example, a hose, is immersed in a bath of liquid, for example, water. If bubbles emerge in the liquid bath during testing for leak gas from the partial branch, the partial flow is adequately adjusted.

If, according to another preferred embodiment of the invention, adjustment of the volume flow rate of the main flow is provided, the feeding of flushing gas can be optimally adapted to the operating conditions of the leak detection system. For adjustment of the main flow, the gas feed device is equipped with a main flow adjusting device.

A variety of measures can be provided either individually or in combination for adjusting the main flow. The provision of a pressure adjustment for the main flow can advantageously be performed in particularly simple manner. In this case, the main flow adjusting device preferably comprises a pressure regulator. If the main flow adjusting device comprises a solenoid valve, a cycle adjustment of the main flow can be implemented. According to another alternative, flow adjustment, for example, with a manually or electrically actuated valve can be provided. Advantageously, the cycle and flow adjustments of the main flow are suitable particularly for regulation of the main flow depending on operating conditions of the leak detection system. Therefore, according to a particularly advantageous variant of the invention, regulation of the main flow (here: first control system) is provided wherein the main flow adjusting device is preferably adjusted depending on the pressure in the flushing device and/or in the detector device.

According to another preferred embodiment of the invention, the partial flow in the partial flow line is also controlled with a control system (here: the second control system). Advantageously, this enables automatic adjustment of the partial flow and, thereby, indirectly, regulation of the system flow of the flushing gas. Preferably, the partial flow is regulated depending on at least one of the operating variables of the leak detection system which include the pressure in the flushing device and the pressure in the detector device. Particular advantages of the operating variable-dependent regulation of the partial flow lie therein that a constant pressure with increased stability can be set in the flushing device. Furthermore, depending on the actual use, different pressures can be set in the flushing device. A further advantage lies in the possibility of detecting the disappearance of the system flow caused, for example, by emptying of the flushing gas source or by an operating fault. The latter may occur, for example, if, due to leakage within the covering, the loss volume flow rate exceeds a pre-determined permissible value.

According to a further advantageous embodiment of the invention, calibration of the detector device for detecting the leak gas is provided. A further improvement in the accuracy and reproducibility of the leak detection system is achieved with a calibration device. For calibration, the system flow can be conducted temporary past the flushing device and detected directly by the detector device. This calibration measurement provides a reference value which is not influenced by leak gas which has passed from the component being tested into the flushing gas. Alternatively, for calibration, a calibration flow supplied by a calibration gas source can be fed to the detector device. Preferably, the calibration flow is adjusted, similarly to the system flow of the flushing gas, with a partial flow control system.

According to a further variant, injection of a calibration gas into the system flow can be provided in order to obtain a precise and reproducible reference variable for the detector device. Advantageously, the injection can be provided at the dividing device of the flushing gas feed device or directly at the flushing device. Advantageously, there is a plurality of possibilities for injecting the calibration gas, for example, by syringe injection, injection by means of a test leak, injection by means of a lifting valve or by pump injection.

If, according to a further embodiment, the dividing device of the gas feed device used according to the invention is closed in relation to its surroundings, this can result in advantages through the prevention of the diffusion of unwanted gases from the surroundings into the system flow.

This is of particular significance for the detection of leaks in a cold environment.

If, in a further embodiment of the invention, the flushing device is part of the leak detection apparatus, advantages can arise for the adaptation of the flushing device to the gas feed and detector devices. Furthermore, the leak detection apparatus can be optimally designed for special applications.

According to another embodiment of the invention, the housing of the flushing device used according to the invention can be tempered. Advantageously, this enables leak detection at different operating temperatures of the component. Particularly preferably, the housing is actively cooled or thermally connected to a cooling device in order to bring the temperature of the housing to a reduced value, for example, to the temperature of liquid nitrogen.

According to another embodiment, the gas feed device of the leak detection apparatus is optionally equipped with a flow unit arranged in the housing. By means of the flow unit, gaseous flushing gas, for example, gaseous nitrogen is introduced into the gas space of the flushing device. In this embodiment of the invention, the flushing device is preferably provided with a coolable housing. Advantageously, heating of the flushing gas and of the component of the vacuum device to be tested is avoided by the influence of the cooled housing.

According to another embodiment of the invention, the flow unit is movably arranged on a wall of the housing. This advantageously enables adjustment of the position of the flow unit relative to the component under test. The variation of the flushing gas feed at different surface regions of the component provides increased sensitivity for the leak detection system.

If the housing of the flushing device has a cylindrical form, the flow unit is preferably rotatable in the wall of the housing about the component to be tested. This variant has particular advantages for the testing of tubular components, for example, for pipe weld seams. For automated operation of the leak detection apparatus, the flushing device is preferably equipped with a drive device by means of which the flow unit is movable.

The leak detection method according to the invention has the following further advantages. The detection limits are below $10^{-10}$ Pa m$^3$/s and therefore significantly below that for conventional helium sniff testing ($10^{-9}$ Pa m$^3$/s). A significantly more rapid testing of test objects can be achieved compared with helium sniff testing or the positive pressure method. In conventional sniff testing, locating small leaks is very time-consuming and impracticable. With the positive pressure method, the measurement duration is often up to 24 hours. With the leak detection method according to the invention, the measurement duration is approximately 30 minutes. Due to the substantially shorter measurement durations, the measurement reliability can be substantially improved. The measurement can also be repeated for verification.

Furthermore, a reduction in atmospheric interference is achieved. During leak detection by the sniff testing method, or the positive pressure method, atmospheric interference can falsify or distort the measurement result. Due to a lack of tightness in the helium supply, a rise in the atmospheric He background often takes place. With the leak detection method according to the invention, the protective gas atmosphere prevents the measurement being falsified or distorted by a rise in the atmospheric He background.

The leak detection method according to the invention also permits substantially simplified local leak detection. Given the presence of a flexible covering, a sniff testing probe can be moved within the covering. This allows even the smallest leaks to be located very accurately and rapidly.

Further details and advantages will be described below by reference to the attached drawings, in which:

DETAILED DESCRIPTION OF PREFERRED EMBODIMENTS

The invention will now be described making reference, by way of example, to leak detection on a vacuum device. It should be noted that the implementation of the invention is not restricted to detection of leaks on vacuum devices, but is also possible accordingly for other technical devices that need to be tested for gas-tightness. Details of a leak detection apparatus according to the invention will be described below by reference, in particular, to implementation of the adjustment of the system flow of the flushing gas. Further details which concern, for example, mass spectrometry sniff testing or components used in fluidics are per se known and will therefore not be explained here.

Figure 1:
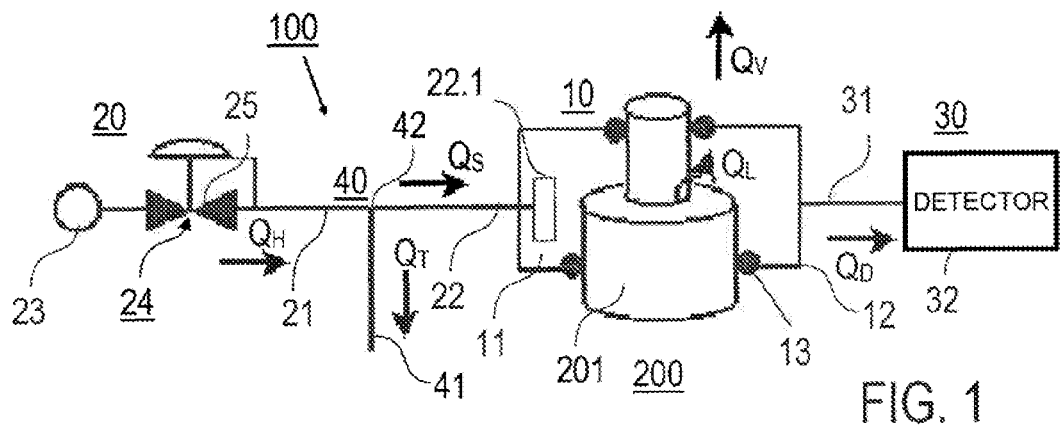
FIG. 1 shows a first embodiment of a leak detection apparatus according to the invention.

FIG. 1 shows a schematic flow diagram of a first embodiment of the leak detection apparatus 100 according to the invention for leak detection in a vacuum device 200. The leak detection apparatus 100 comprises a flushing device 10, a gas feed device 20 and a detector device 30. The flushing device 10 is optionally a separate part which is combined with the leak detection apparatus 100.

The flushing device 10 comprises a closed flushing chamber 11 round the component 201 of the vacuum device 200 to be tested. The flushing chamber 11 is enclosed by a covering 12 which is fastened with a seal 13 onto the surface of the component 201 to be tested. The covering 12 may comprise a fixed wall made, for example, from plastics, so that the flushing device 10 forms a fixed housing. Alternatively, the covering 12 may be flexible and made, for example, from a plastics film. In this case, the flushing device 10 can be adapted highly flexibly to various component forms. The seal 13 comprises, for example, an elastic material arranged between the covering 12 and the surface of the component 201 (e.g. rubber or adhesive or filler putty) and/or at least one adhesive strip with which the covering 12 is fastened to the surface of the component 201.

The flushing device 10 comprises line connectors to which lines for connecting the gas feed device 20 are attached and the detector device 30 can be coupled. In the simplest case, a line connector (not shown in FIG. 1) comprises a hole in the covering 12 in which the relevant line is inserted, or a coupling sleeve for accommodating and fixing the line. Typically, the lines are detachably fastened to the line connectors. For particular applications, however, it is advantageous if the lines are firmly connected to the covering. The covering and the adjoining lines may be formed, in particular, from the same material and in one piece.

The gas feed device 20 comprises a main flow line 21, a system flow line 22 and a partial flow line 41. The main flow line 21 leads from a flushing gas source 23 via a main flow adjusting device 24 with a dosing valve 25 to the dividing device 40 which is used according to the invention. At the dividing device 40, the main flow line 21 branches into the system flow line 22 and the partial flow line 41. The system flow line 22 leads from the dividing device 40 to the flushing device 10. Arranged at the end of the system flow line 22 is a flow unit 22.1, by means of which flushing gas is fed into the flushing chamber 11.

Advantageously, the length of the system flow line 22 can be chosen within a wide range, depending on the specific application. Due to the automatic feeding of the system flow $Q_S$ depending on the pressure in the flushing device 10, the length may be greater than 5 m or greater even than 10 m, for example, 12 m. Accordingly, the gas feed device for leak detection in large complex systems can be arranged locally fixed and flexibly connected to the covering 12 at the respective current testing position. For this purpose, the system flow line 22 or the detector flow line 31 preferably comprises a flexible hose. The hose of the system flow line 22 is made, for example, from plastics and has an internal diameter of 4 mm. The detector flow line 31 typically comprises a sniffer probe with a flexible hose.

For the branching off of the partial flow line 41, in the embodiment of the invention shown in FIG. 1, the dividing device 40 comprises a T-piece 42, the branches of which are formed by the main, system and partial flow lines 21, 22 and 41. With regard to the mutual orientation of the lines at the T-piece 42, no limitations exist. It is possible, in particular, that one of the system and partial flow lines 22, 41 is configured as a continuation of the main flow line 21 (see FIGS. 1, 3).

The partial flow line 41 leads from the T-piece 42 to an end which opens in surroundings with ambient atmosphere or in a large-volume regeneration vessel. The end of the partial flow line 41 can comprise a free line end or a closure with which reverse diffusion of ambient gas into the dividing device is prevented (see FIG. 5).

The detector device 30 comprises a detector line 31 which leads from the flushing device 10 to a detector 32. The detector line 31 ends in the flushing chamber 11 with a free line end or a sniffer probe (not shown). The detector 32 serves to detect any leak gas (test gas) that may emerge from the interior of the component 201 into the flushing chamber 11. For this purpose, a detector which is known per se from the field of leak detection, for example a helium detector with a vane-type rotary pump, is issued.

The subsequent volume flow rates of the flushing gas flow through the leak detection apparatus 100. A main flow $Q_H$ is created by the flushing gas source 23. The flushing gas source 23 is a pressurized gas source. The flushing gas (e.g. nitrogen) is fed from a flushing gas source 23 under a working pressure of, for example, 0.5 bar. The volume flow rate of the main flow $Q_H$ is adjusted with the dosing valve 25 which is equipped with a differential pressure manometer. At the T-piece 42, the main flow $Q_H$ divides into the system flow $Q_S$ and the partial flow $Q_T$. The partial flow $Q_T$ flows away through the partial flow line 41 into the surroundings. The partial flow $Q_T$ is influenced inter alia by the flow resistance in the partial flow line 41. Accordingly, by means of the selection of a particular internal diameter and/or a particular length for the partial flow line 41, the possibility for adjusting the partial flow $Q_T$ exists. The system flow $Q_S$ flows through the system flow line 22 into the flushing device 10. In the flushing device 10, the system flow of the flushing gas is increased by a leak gas flow $Q_L$ possibly emerging from the component 201 and reduced by a loss flow $Q_V$, for example, due to lack of gas-tightness in the covering 12. The flushing gas emerging to the detector device 30 with any leak gas it contains represents the detector flow $Q_D$.

The leak detection according to the invention comprises the following steps. Firstly, the flushing device 10 is attached to the component 201 to be tested. The gas feed device 20 and the detector device 30 are connected to the flushing device 10. Subsequently, operation of the gas feed device 20 starts.

A pre-determined main flow $Q_H$ is set, which divides into the partial flow $Q_T$ and the system flow $Q_S$.

At the point of division, the pressure of the leak detection apparatus 100 is set to be in the range of 1 mbar to 10 mbar above the atmospheric pressure of the surroundings. The detector flow $Q_D$ drawn in by the detector device 30 from the leak test is constantly tracked in the dividing device via the system flow $Q_S$, whilst the remaining volume flow rate of the main flow $Q_H$ flows as a partial flow $Q_T$ into the surroundings. In this state, detection of the leak gas $Q_L$ in the detector flow $Q_D$ of the detector device takes place.

If, due to variations during operation of the detector device or due to loss flows $Q_V$, the pressure in the flushing chamber 11 falls or rises, the system flow $Q_S$ is automatically adjusted. If the pressure falls in the flushing chamber 11, the system flow $Q_S$ rises whilst, conversely, if the pressure rises in the flushing chamber 11, the system flow $Q_S$ is reduced. The volume balance within the covering 12 is constant. Detection of the leak gas in the detector 32 and the further evaluation of measurement results is carried out in a manner that is per se known.

Figure 2:
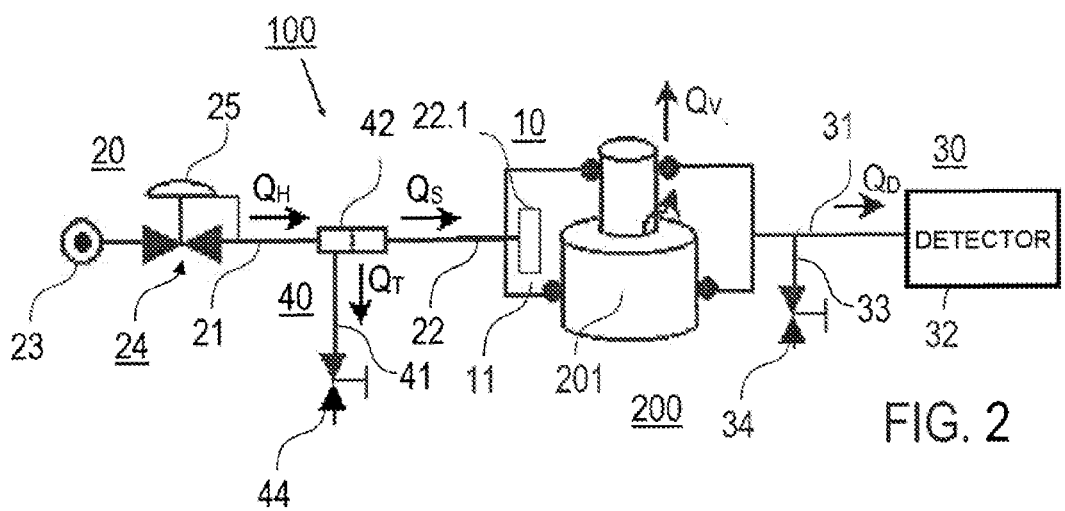
FIG. 2 shows another embodiment of the leak detection apparatus according to the invention.

FIG. 2 shows a further embodiment of the leak detection apparatus 100 according to the invention, the components of which, where they match those of FIG. 1, have the same reference signs. A first difference from the embodiment shown above lies in the provision of a partial flow adjusting device 44 in the partial flow line 41. The partial flow adjusting device 44 comprises a manually actuated dosing valve. Alternatively, the partial flow adjusting device 44 can have a regulated dosing valve which is adjustable with a differential pressure manometer (see FIG. 7). A further difference from the above described embodiment lies in the branching off of a flushing line 33 from the detector line 31. The flushing line 33 comprises a flushing flow adjusting device 34 which, for example, comprises a manually actuated dosing valve, or alternatively a magnetically actuated dosing valve can be provided (see FIG. 7). Finally, the leak detection apparatus 100 of FIG. 3 has, in place of the T-piece, a partial flow chamber 42, which is shown with further details in FIG. 3.

The partial flow adjusting device 44 offers the following advantages. Firstly, it enables the setting of a particular flow resistance in the partial flow line 41 and thereby, the setting of a particular pressure in the flushing device 10 in the dividing ratio between the system and partial flows $Q_S$, $Q_T$. Furthermore, together with the flushing flow adjusting device 34, the partial flow adjusting device 44 enables flushing of the flushing device 10 during a preparation step before the leak test. In a preparation step, the flushing device 10 is initially flushed with flushing gas. For this purpose, the partial flow adjusting device 44 is closed and the flushing flow adjusting device 34 is opened, so that the entire main flow $Q_H$ flows through the flushing device 10. By means of this flushing, the leak gas system background in the flushing device 10 can be reduced, depending on the leak detection task in question, from $5 \times 10^{-7}$ to as far as $10^{-12}$ Pa m$^3$/s. Subsequently, the flushing flow adjusting device is closed and the partial flow adjusting device 44 is opened. In this condition, leak gas testing takes place and the detector flow $Q_D$ drawn off by the detector 32 is constantly tracked by the system flow $Q_S$.

In addition, when flushing a flexible covering, in order to reduce the flushing gas amount, a vacuum pump (not shown) can be connected to the flushing flow adjusting device 34. For this purpose, the dosing valve 25 and the partial flow adjusting device 44 are closed and the flexible covering is pumped out via the flushing flow adjusting device 34 with the vacuum pump. Closing the flushing flow adjusting device 34 and opening the dosing valve 25 causes flushing gas to be introduced into the pumped-out covering until a positive pressure relative to the surrounding atmosphere is reached.

Figure 4:
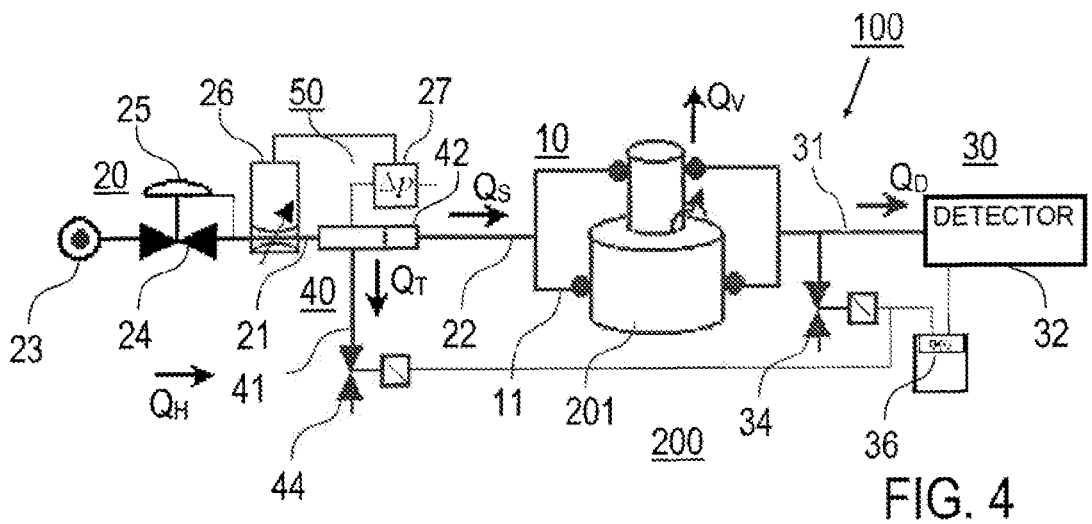
FIGS. 4 to 14 show further embodiments of a leak detection apparatus according to the invention.
Figure 6:
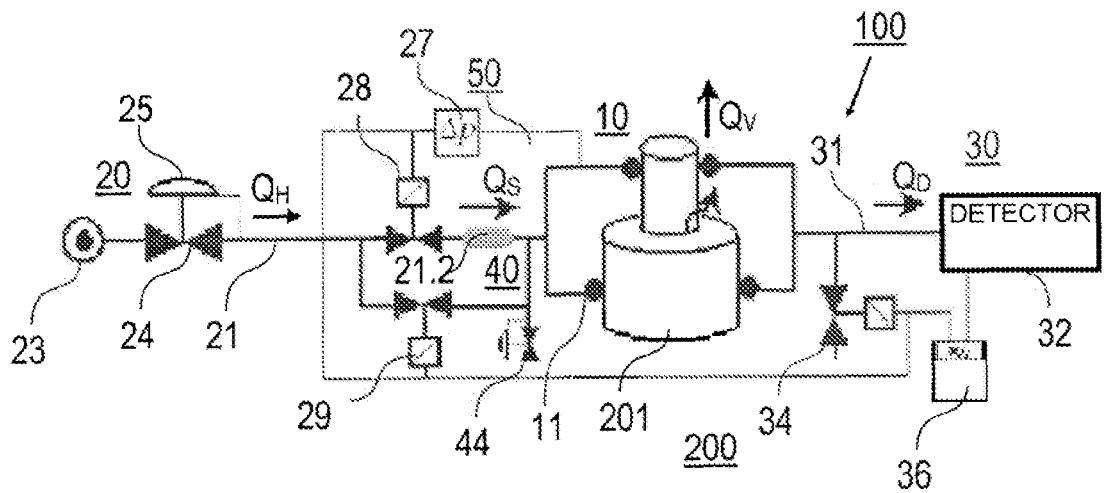
Figure 9:
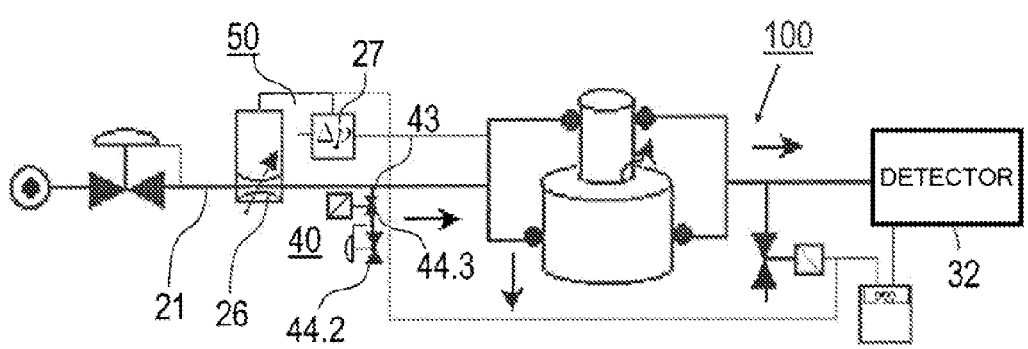

As distinct from the scheme shown in FIG. 2, a manually or magnetically actuated dosing valve can be provided in the main flow line 21 between the main flow adjusting device 24 and the dividing device 40, said dosing valve serving to adjust the main flow $Q_H$ (see, for example, FIGS. 4, 6 and 9). According to a further variant, the partial flow adjusting device 44 comprises a combination of a dosing valve 41.1 and an overflow valve 44.2 (FIG. 7) connected in parallel thereto. This circuit combination prevents too high a pressure building up in the flushing device 10 with the dosing valve 41.1 closed, particularly during leak detection under low temperature conditions. By means of the partial flow adjusting device 44, a pressure is set in the leak detection apparatus 100 such that a higher pressure exists in the system, particularly in the flushing chamber 11, than in the atmospheric surroundings.

Figure 3:
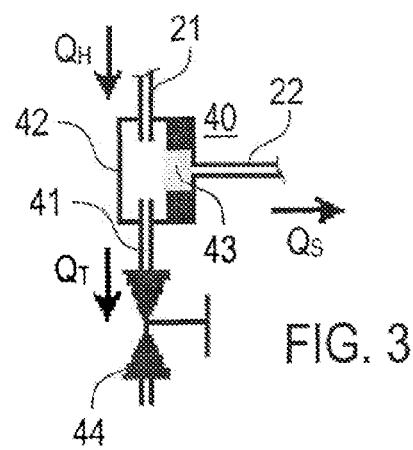
FIG. 3 shows details of a dividing device according to the invention.

In the embodiment of the invention shown in FIG. 2, the dividing device 40 comprises a partial flow chamber 42 which is shown in greater detail in FIG. 3. The partial flow chamber 42 has three connections. The main flow line 21 is connected via the first connection, through which the main flow $Q_H$ is introduced into the partial flow chamber 42. The system flow line 22 and the dividing line 41 are connected via the other connections, through which the system flow $Q_S$ and the partial flow $Q_T$ branch off the main flow $Q_H$. The internal volume of the partial flow chamber 42 is, for example, 10 cm$^3$. Arranged in the partial flow chamber 42 is a pressure reducer 43, which comprises a porous filter insert or a throttle diaphragm and provides oscillation-free setting of the system flow $Q_S$. The system flow $Q_S$ is constantly fed in oscillation-free manner from the main flow $Q_H$. The partial flow chamber 42 advantageously enables decoupling of the system flow $Q_S$ from the flushing gas supply.

FIG. 4 shows a further embodiment of the leak detection apparatus 100 according to the invention, the components of which are identified with the same reference signs insofar as they agree with the above described variants. Compared with the embodiment according to FIG. 2, it has essentially the following differences. Firstly, a flushing control device 36 is provided, with which the partial flow and flushing flow adjusting devices 44, 34 are controllable. The adjusting devices 44, 34 comprise magnetically actuatable dosing valves in combination with magnetic switches (solenoid valves). The above described preparation step for flushing the flushing device 10 can be automated with the flushing control device 36.

Another peculiarity of the embodiment of FIG. 4 lies therein that the main flow adjusting device 24 also has a flow adjusting element 26, which can be actuated depending on the pressure in the partial flow chamber 42. By means of a differential pressure sensor 27, the pressure difference between the partial flow chamber 42 and the surrounding atmosphere is detected and converted into an actuating signal. The components 26 and 27 provide the first control circuit 50, with which the main flow $Q_H$ is controllable such that a constant differential pressure in relation to atmospheric pressure is produced within the partial flow chamber 42. If the differential pressure falls, the flow adjusting element 26 is opened further and the main flow $Q_H$ is thereby increased. The first control circuit 50 causes the differential pressure in the partial flow chamber 42 as set and, with it, also the system pressure in the flushing device 10 to remain constant.

Figure 5:
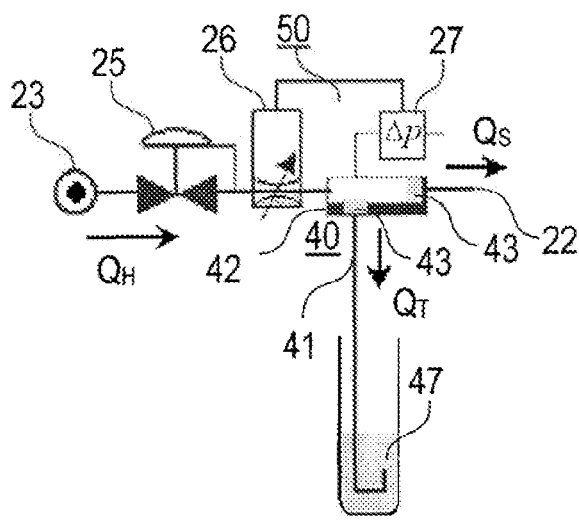

Further details of the first control circuit 50 are shown in FIG. 5. The partial flow chamber 42 is constructed similarly as in FIG. 3 with an inner chamber and three connections. Porous filter inserts 43 (or throttle diaphragms) are arranged at the branching off of the system flow line 22 and the partial flow line 41 for pressure reduction and oscillation decoupling.

The first control circuit 50 enables improved decoupling of the system flow $Q_S$ from the flushing gas supply. The detector flow drawn off by the detector device 30 can be tracked constantly and in oscillation-free manner with the regulated main flow $Q_H$ via the system flow $Q_S$. The condition $P_{system} \geq P_{atm}$ is automatically set by the dividing device 40. If the pressure in the partial flow chamber 42 falls, the main flow $Q_H$ is increased. The differential pressure between the partial flow chamber 42 and the surrounding atmosphere remains stable throughout the measurement duration. Manual setting of the gas feed is not required, and this produces advantages for automated operation of the leak detection.

If instabilities arise due to loss flows out of the covering 12, these are compensated for with the dividing device 40 by means of an increase in the system flow $Q_S$. A similar principle applies for faults arising in the pressure in the flushing device 10 due to volume variations in the covering 12. The excess covering gas arising from a volume reduction can flow away into the atmosphere via the dividing device 40. Volume variations may be caused by air movements or temperature changes.

FIG. 5 also shows a closure 47 of the end of the partial flow line 41. If the partial flow $Q_T$ were to sink too low, air from the surroundings and, with it, atmospheric helium could flow via the dividing device 40 into the leak detection apparatus. Since helium is typically used as a leak gas or test gas, the result of the leak test could be falsified thereby. If extremely high demands are placed on the detection limit of the leak detection, ingress of surrounding air can be avoided with the closure 47.

In the illustrated embodiment of the invention, the closure 47 is equipped with a liquid barrier. The free end of the partial flow line 41 is immersed in the liquid barrier, for example, water. If there is a positive pressure in the partial flow chamber 42, the partial flow $Q_T$ could flow out upwardly through the liquid barrier. If, however, the partial flow $Q_T$ decreases towards zero, no air can diffuse in through the partial flow line 41. The illustrated closure 47 has the advantage that the correct setting of the operating condition of the leak detection apparatus 100 can readily be observed at the closure 47. As long as bubbles rise at the closure 47 through the liquid barrier, the partial stream $Q_T$ still exists and is sufficient for automatic tracking of the system flow, $Q_S$. As an alternative to the variant with the liquid barrier, the closure 47 can be equipped with a mechanical barrier. In this case, the end of the partial flow line 41 is connected to a vertically oriented ascending pipe (not shown). Bores are provided along the length of the ascending pipe. The free end of the partial flow line 41 is closed with a ball in the ascending pipe. When the partial flow $Q_T$ impinges upon the ball, the ball can be lifted so that the partial flow flows away through the bores in the ascending pipe to the atmosphere. If the pressure in the system falls, the ball descends so that the end of the partial flow line 41 is closed and penetration of ambient air into the system is prevented.

In the embodiment of the invention shown in FIG. 6, compared with the version according to FIG. 4, the following modifications are provided. Firstly, the main flow adjusting device 24 comprises a solenoid valve 28 with which the main flow $Q_H$ is adjustable by cycling. This adjustment takes place in the first control circuit 50 depending on the pressure in the flushing chamber 11 of the flushing device 10. By means of the differential pressure sensor 27, the pressure difference in the flushing chamber 11 relative to the surrounding atmosphere is detected and the solenoid valve 28 is controlled in cycled manner accordingly. This enables a volume adjustment depending on the pressure in the flushing device 10.

Another special feature of the embodiment according to FIG. 6 is the provision of a bypass solenoid valve 29 which is controllable for flushing the flushing device 10 before leak testing. As distinct from the variant according to FIG. 4, the bypass solenoid valve 29 together with the flushing flow adjusting device 34 is controlled by the flushing control device 36. Alternatively, the first control circuit 50 shown in FIG. 6 can be combined with a magnetically actuated partial flow adjusting device 44 according to FIG. 4.

Since, with the first control circuit 50, according to FIG. 6, the solenoid valve 28 is actuated depending on the pressure in the flushing chamber 11, the partial flow chamber can be replaced by a simple T-piece 42. Here, the partial flow line 41 branches off from the main flow line 21. A dosing valve with a differential pressure regulator is provided as the partial flow adjusting device 44 in the partial flow line 41.

FIG. 6 also illustrates a sound pressure damper 21.2, which is arranged in the main flow line 21 and serves to reduce system oscillations due to the cycled operation of the solenoid valves. The sound pressure damper 21.2 can also be provided, in the other embodiments described herein, with or without solenoid valves.

For leak testing, according to the embodiment according to FIG. 6, the aforementioned preparation step takes place first of all. During this step, the solenoid valve 28 and the bypass solenoid valve 29 and the flushing flow adjusting device 34 are opened in order to pass flushing gas through the flushing device 10. Subsequently, the bypass solenoid valve 29 is closed and the leak gas detection is carried out with the detector 32. In this step, the main flow $Q_H$ is regulated depending on the pressure in cycled manner through the solenoid valve 28 into the flushing chamber 11.

Figure 7:
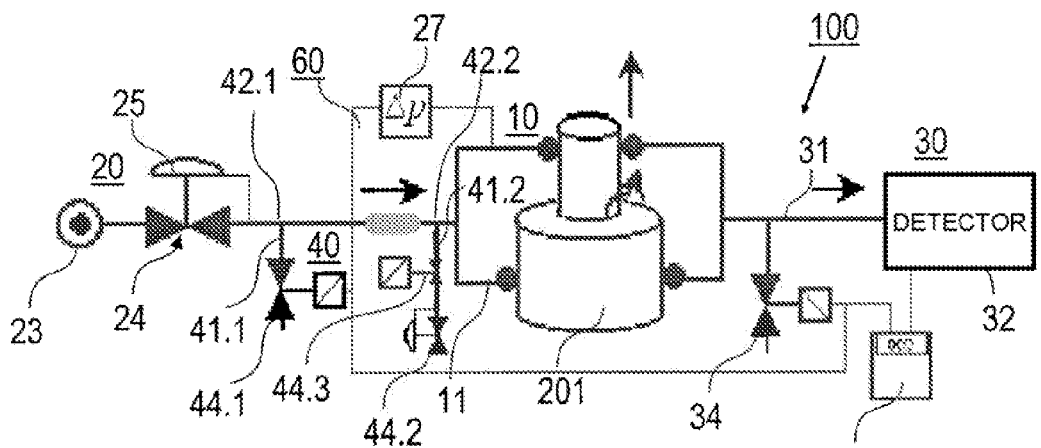

FIG. 7 shows another embodiment of the invention wherein the dividing device 40 comprises two T-pieces 42.1, 42.2 at which two partial flow lines 41.1, 41.2 branch off from the main flow line 21 or the system flow line 22, respectively. The partial flow adjusting device comprises, in the partial flow lines 41.1, a solenoid valve 44.1 and, in the partial flow lines 41.2, a dosing valve with a differential pressure manometer 44.2 and a further solenoid valve 44.3. The magnetic valve 44.1 is adjustable depending on the pressure in the flushing device 10. Provided for this purpose is the differential pressure sensor 27, with which a pressure difference between the internal pressure in the flushing chamber 11 and the ambient atmospheric pressure is detected and a corresponding actuating signal is issued to the solenoid valve 44.1. The second control circuit 60 which serves for automatic adjustment of the flow resistance in the first partial flow line 41.1 and therefore the adjustment of the partial flow $Q_T$ through the first partial flow line 41.1, comprises the components 44.1 and 27. The second partial flow line 42.2 serves for overflow regulation. The dosing valve 44.2 is only opened with the differential pressure manometer when a predetermined positive pressure is reached in the second partial flow line 42.2. The limit pressure is, for example, 10 mbar. If the limit pressure is not exceeded, the dosing valve 44.2 remains closed. In particular during leak detection in cold conditions, the limit pressure can be reached very rapidly.

For leak detection, in the stated preparation step, the solenoid valves 44.1 and 44.3 are closed by the flushing control device 36, so that said main flow $Q_H$ flows into the flushing device 10. At the same time, the flushing flow adjusting device 34 is opened, so that the flushing gas emerging from the flushing chamber 11 is conducted away past the detector 32 into the surrounding atmosphere. Finally, the solenoid valve 44.1 is opened and the flushing flow adjusting device 34 is closed in order to carry out the leak test.

Figure 8:
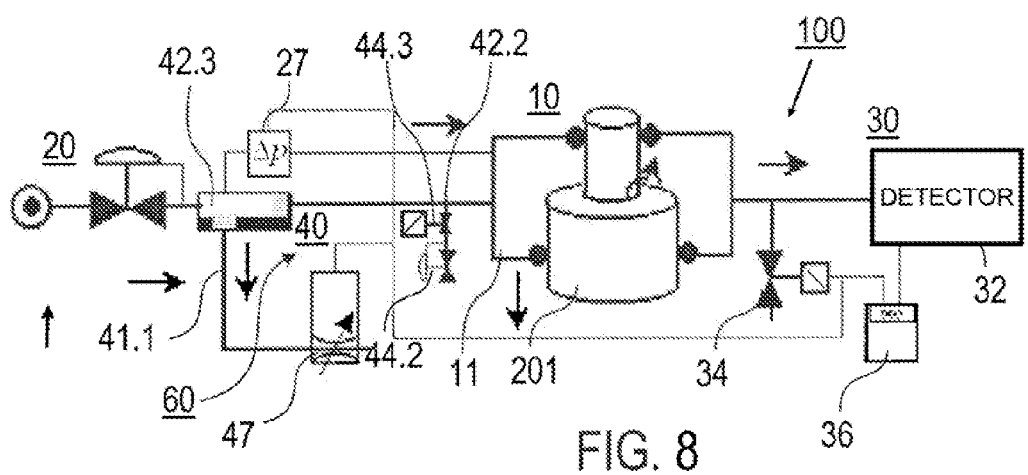

FIG. 8 shows a variant of the embodiment according to FIG. 7, wherein the first T-piece 42.1 is replaced by a partial flow chamber 42.3. The first partial flow line 41.1 in which a flow adjusting element 47 is arranged branches off from the partial flow chamber 42.3.

A differential pressure sensor 27 is provided between the internal chamber of the partial flow chamber 42.3 and the flushing chamber 11 of the flushing device 10. Depending on the measured differential pressure, an actuating signal for actuating the flow adjusting element 47 is generated. The second control circuit 60 for regulating the partial flow $Q_T$ comprises the components 47 and 27.

According to a further embodiment of the leak detection apparatus 100 shown in FIG. 9, the first control circuit 50 comprises the differential pressure sensor 27 and the flow adjusting element 26 in the main flow line 21. Regulation of the flow adjusting element 26 is carried out depending on the pressure in the flushing chamber of the flushing device. In this case, as distinct from the variant according to FIGS. 4 and 5, the partial flow chamber can be replaced by a T-piece 42.3.

Like the embodiment of FIG. 7, this circuit also comprises a solenoid valve 44.3 and a dosing valve 44.2. If a predetermined limit pressure is exceeded, the dosing valve 44.2 opens so that a controlled outflow of excess flushing gas is enabled.

Depending on the operating and evaluating method, leak testing by the flushing gas method permits determination of the leakage rate using the dynamic or static flushing gas method. With the dynamic flushing gas method, flushing gas is continuously fed by the detector device 30 into the flushing device 10.

With the dynamic flushing gas method, for the calculation of leakage rate when a hermetically sealed covering 12 is used the following equation applies.

$$\frac{d(pV)_{Flushing-device}}{dt} = q_{pV} + p_{Zu} * \overset{*}{V}_{Zu} - p_{Flushing-device} * S_{eff}$$

where p=pressure in the flushing chamber 11, V=Volume of the flushing chamber 11, t=time, q=leakage rate of the component under test, $p_{zu}$=pressure of $Q_S$, $V_{zu}$=volume flow rate $Q_S$, and $S_{eff}$=suction capacity of the detector.

With the static flushing gas method, following flushing, the flushing device is closed for a defined waiting period and then the leak gas is detected in the detector stream. The following equation applies for the static flushing gas method:

$$q_{pV} = \frac{V_{Flushing-device} * \Delta p_{Test-gas}}{\Delta t}$$

where V=volume of the flushing device, $\Delta p$=partial pressure of the test gas, and q=the leakage rate.

Figure 10:
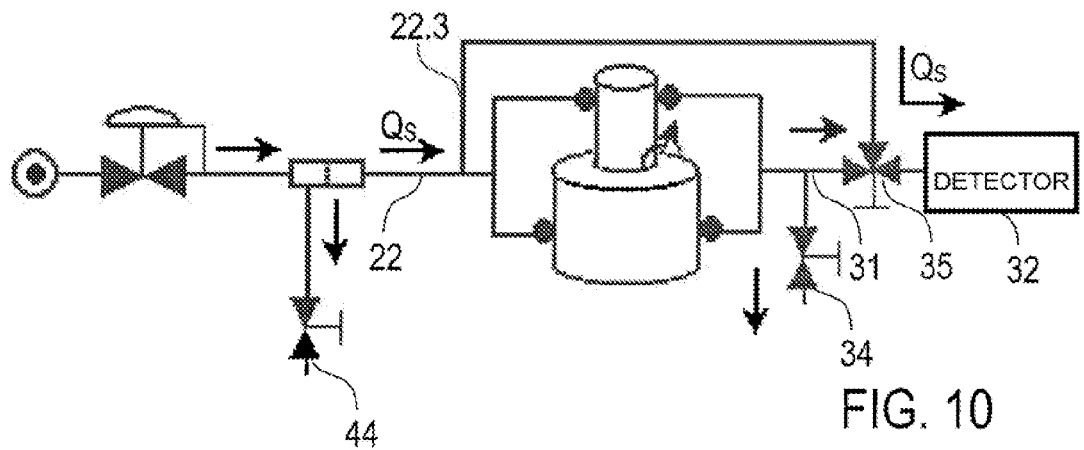
Figure 11:
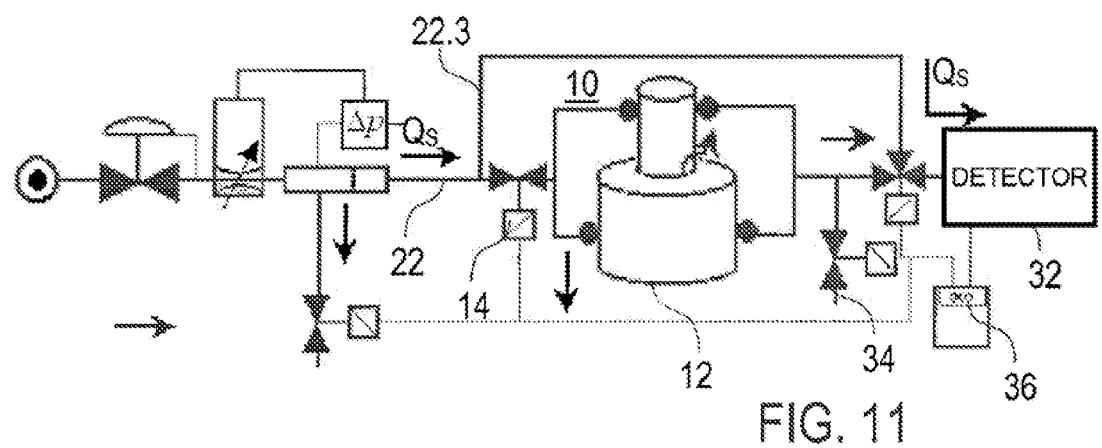

The variants of the leak detection method described above can be modified for a combined dynamic and static flushing gas method, as will be explained now making reference to FIGS. 10 and 11. According to FIG. 10, the flow scheme for leak detection is as shown in FIG. 2 with the addition of a 3/2-way valve 35 in the detector line 31 and a bypass line 22.3 which leads directly from the system flow line 22 to the 3/2-way valve 35. The bypass line 22.3 permits the system flow $Q_S$ to be fed directly to the detector 32. This is advantageous since the volume balance of the detector 32 is kept constant during the leak test. The bypass line 22.3 has the additional advantage that the detector flow $Q_D$ can be kept constant for the duration of a displacement of the covering 12 on the component 201 to be tested.

With the combined static and dynamic flushing gas method, firstly in a preparation step, flushing of the flushing chamber 11 with the adjusting devices 44 and 34 takes place. In this condition, the 3/2-way valve 35 is also switched to allow passage from the detector line 31 to the detector 32. The bypass line 22.3 is blocked. The system leakage rate is then determined over a period of a few minutes and a limit function is calculated using the equation of the dynamic flushing gas method. Above this limit function, an equilibrium condition becomes established. When a leak is detected, the leakage rate of the leak and its limit function calculated using the dynamic equation can also easily be verified by a change-over from the dynamic flushing gas method to the static flushing gas method using the substantially simpler equation of the static method. For this purpose, the 3-way valve 35 is closed so that only flushing gas from the flushing gas supply is drawn in by the detector 32 via the bypass line 22.3 and the system flow line 22.

When the limit function is reached, the 3-way valve 35 is opened and the leakage rate is determined again using the dynamic flushing gas method. This enables calculation of the leakage rate according to the static flushing gas method and checking of the previously calculated limit function. If the system leakage rate is stable, the condition of the limit function is fulfilled. This static condition permits the leakage rate of the leak to calculated substantially more easily and reliably using the equation of the dynamic flushing gas method.

The advantage of the combination of static and dynamic flushing gas methods lies therein that the detection reliability of the leak detection is improved and the determined rate of leakage from the component 201 can be verified.

The bypass line 22.3 and the 3/2-way valve 35 can also be provided accordingly for the flow scheme of FIG. 4. As shown in FIG. 11, a covering valve 14 is provided between the branching off of the bypass line 22.3 from the system flow line 22 and the covering 12 of the flushing device 10. The covering valve 14 is a solenoid valve, which can be actuated with the flushing control device 36. If the valve 14 is closed and the 3/2-way valve 35 is open, the system flow $Q_S$ flows via the bypass line 22.3 directly to the detector 32.

Figure 12:
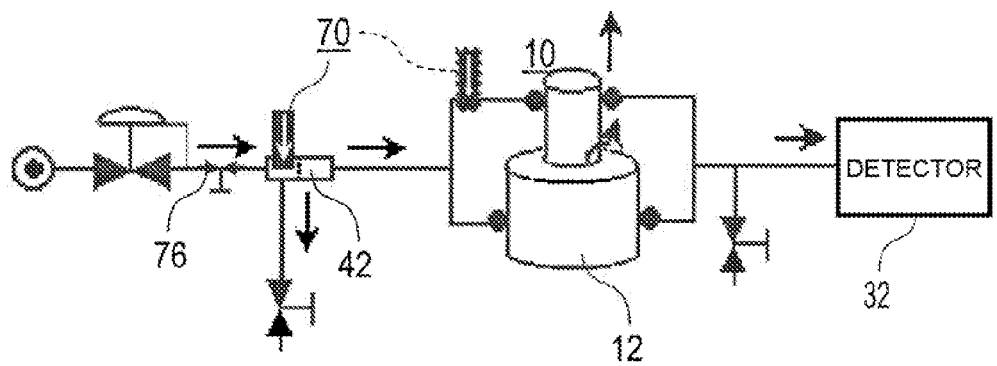

With the dynamic flushing gas method, injection of a test gas mixture into the leak detection apparatus takes place. The test gas is a mixture of test gas and flushing gas. The test gas can be injected directly into the partial flow chamber 42 (see FIG. 12) or into the covering 12 of the flushing device 10. For this purpose, an injection device 70 with a valve or, in particular, a solenoid valve 76 is arranged at the partial flow chamber 42 (or accordingly at the covering 12).

Figure 13:
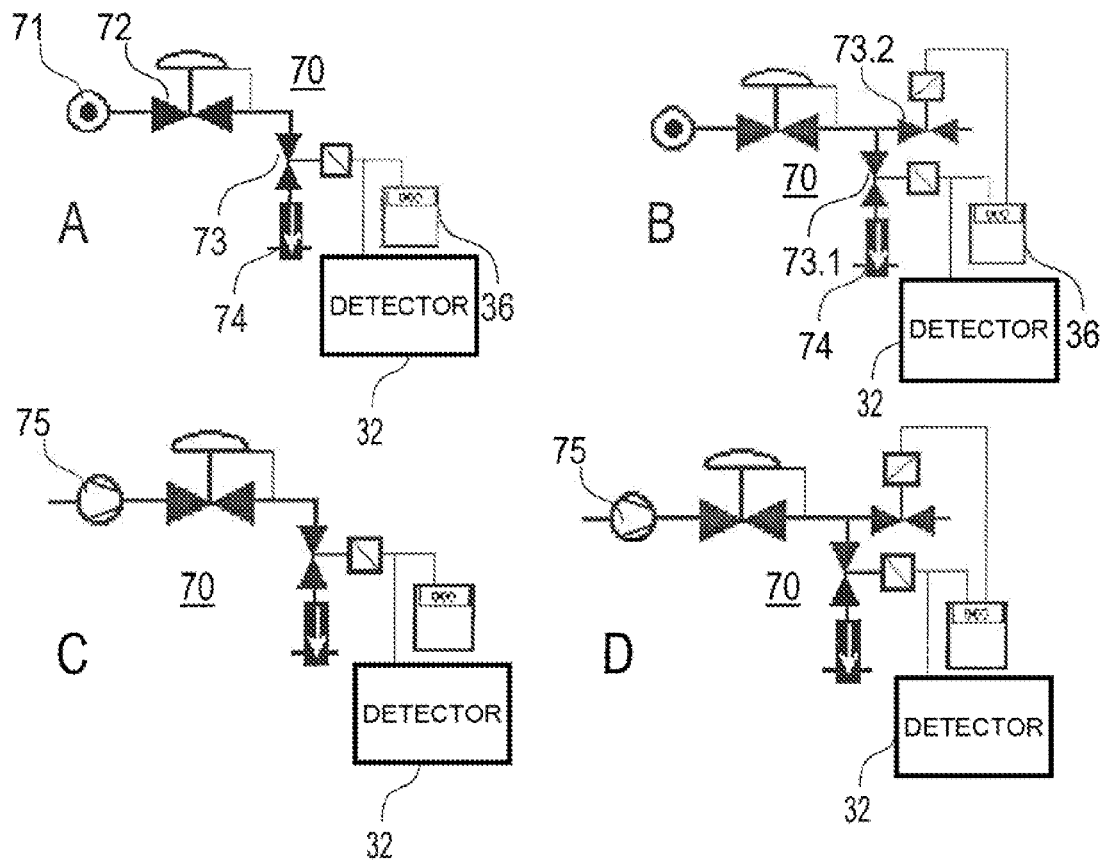

In the simplest case, the injection device 70 comprises a syringe or a dosing valve for introducing air into the partial flow chamber at a leakage rate of $5 \times 10^{-6}$ mbar l/s. Alternatively to air, helium or a helium-test gas mixture or an atmospheric test leak can be used. The injection device 70 can be actuated manually. Alternatively, actuation with a control device, for example, the flushing control device 36 can be provided as shown, for example, in FIG. 13.

According to FIG. 13A, the injection device 70 comprises a test gas source 71, a pressure regulator 72, a solenoid valve 73 and an injector 74. The solenoid valves 73 and 76 (see FIG. 12) are actuated with the flushing control device 36 in order to introduce a pre-determined volume flow rate of the test gas into the leak detection apparatus (not shown). For this purpose, the valve 76 is closed and the valve 73 is opened. In the variant according to FIG. 13B, two solenoid valves 73.1, 73.2 are provided, with which the test gas is either fed to the injector 74 or diverted into the surroundings. In place of the test gas source 71, according to the variants in FIGS. 13C and 13D, a pump 75 can be provided, with which the test gas is supplied at a pre-determined positive pressure. Dosing of the test gas takes place with the solenoid valves 73 or 73.1, depending on the switching intervals of the magnet control system. The variants of FIGS. 13B and 13D have advantages for the feeding of the smallest test gas volumes since, with these problems caused by the switching times of the magnet control system are avoided.

In the simplest case of test gas injection, by the injection of a very small mass of test gas, the reaction time of the measuring apparatus is determined.

A further advantage of the test gas injection lies therein that the measurement duration for reaching the aforementioned limit function can be significantly shortened. By means of the injection device, the system leakage rate is increased to the limit function calculated in advance. This established system condition, permits the leakage rate of the leak to be calculated substantially more easily and reliably according to the dynamic equation. In addition, given that the injected gas quantity is known, the possibility exists of calculating the volume of the covering and thus of determining the leakage rate of the leak substantially more accurately.

The advantage of the injection for the dynamic flushing gas method lies in the substantial reduction in the measurement duration. As a consequence of the determination of the system leakage rate over several minutes, the leakage rate for the component to be tested can be calculated from the limit function of the system leakage rate.

Figure 14:
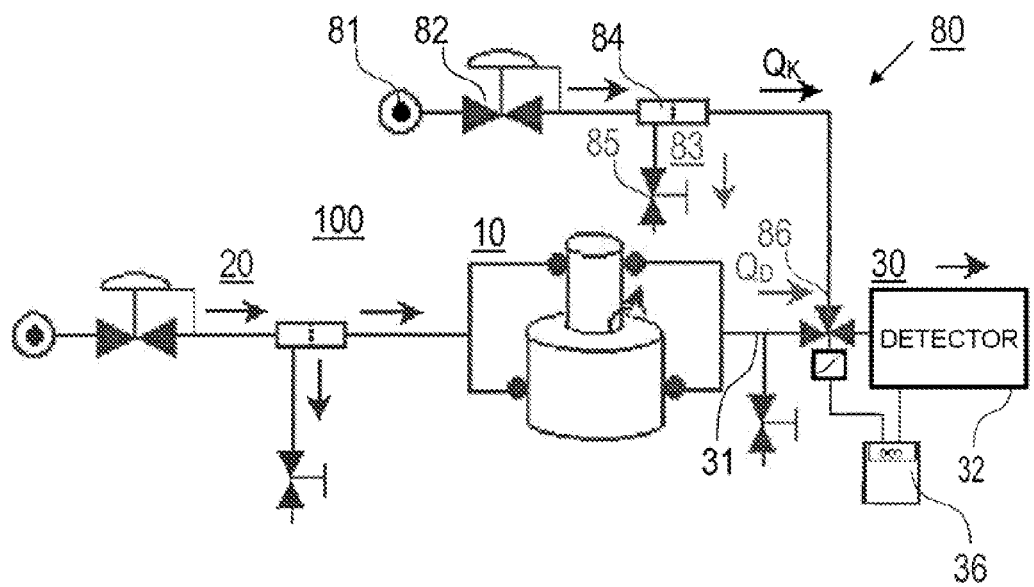

FIG. 14 shows a further embodiment of the leak detection apparatus 100 according to the invention, which is constructed with the flushing device 10, the gas feed device 20 and the detector device 30 as illustrated in the embodiment of the leak detection apparatus shown in FIG. 2. In addition, a calibration apparatus 80 is provided which comprises a calibration source 81, a pressure regulator 82 and a calibration flow dividing device 83 with a calibration flow dividing chamber 84 and a calibration flow adjusting device 85 and is connected via a 3/2-way valve 86 to the detector line 31. The 3/2-way valve 86 can be actuated magnetically with the flushing control device 36.

For calibration of the detector 32, the 3/2-way valve 86 is switched over from the detector flow $Q_D$ to the calibration flow $Q_K$, which is regulated mechanically or electronically controlled in a similar manner to the functioning of the partial flow device 40 described above with the calibration flow adjusting device 85. Calibration is performed with a calibration gas, such as compressed air or a test gas mixture.

The calibration flow-partial flow control system 83 can be dispensed with if the adjustment of the calibration flow $Q_K$ is carried out sufficiently accurately with the pressure regulator 82. However, provision of the calibration flow dividing device 83 has the advantage that the calibration flow $Q_K$ can be adjusted to the setting of the system flow $Q_S$ to a high degree of accuracy. For this purpose, according to an alternative variant, a regulated calibration flow-partial flow control system 83 is provided which is configured similarly to the first control circuit 50 described above (see FIG. 4).

Figure 15:
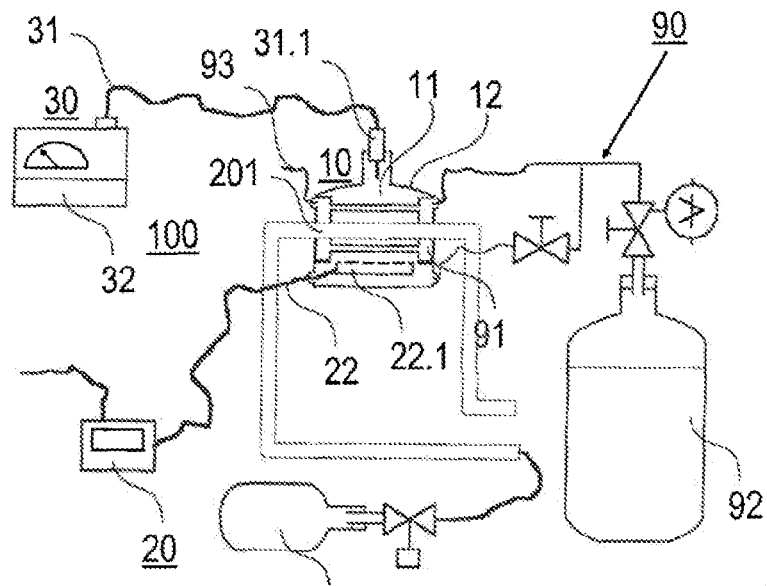
FIG. 15 shows an embodiment of the leak detection apparatus according to the invention with a coolable housing.

FIG. 15 shows a further embodiment of the leak detection apparatus 100 according to the invention comprising the flushing device 10, the gas feed device 20 and the detector device 30. The flushing device 10 comprises a fixed covering 12 in order to form the flushing chamber 11 on the component 201 (pipeline) to be tested. Flushing gas is passed via the system flow line 22 and the flow unit 22.1 from the gas feed device 20 to the flushing device 10. The detector device 30 comprises the detector flow line 31 and the detector 32. Arranged at the end of the detector flow line 31 which extends into the flushing chamber 11 is a sniffer probe 31.1. The component 201 to be tested is linked to a leak gas source 202 which, for example, comprises a helium source.

In the embodiment of the invention shown in FIG. 15, the flushing device 10 is equipped with a tempering device 90 with which the flushing gas in the flushing chamber 11 and the component 201 being tested can be tempered. The tempering device 90 comprises a nitrogen cooler 91 for accepting liquid nitrogen. The nitrogen cooler 91 is supplied with liquid nitrogen from the nitrogen reservoir 92. Evaporating nitrogen is released into the surroundings via a line 93.

When the pressure in the flushing chamber 11 is reduced by tempering with liquid nitrogen, the partial flow method used according to the invention advantageously provides an increased system flow of the flushing gas into the flushing device 10. Thus a stable state is advantageously achieved in the flushing chamber 10 for leak gas testing, depending on the test temperature. As an alternative to the illustrated cooling of the component under test, heating with suitable means can also be provided.

Figure 16:
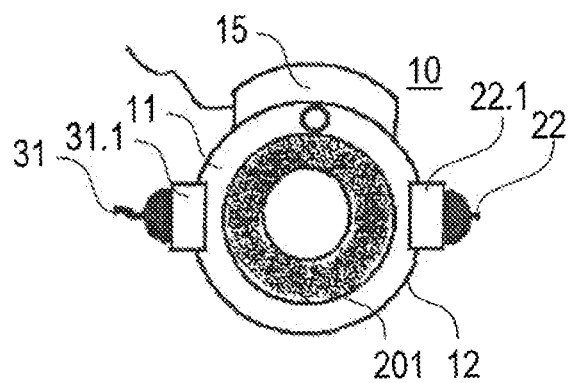
FIG. 16 shows an embodiment of the leak detection apparatus according to the invention with a movable flow unit.
Figure 17:
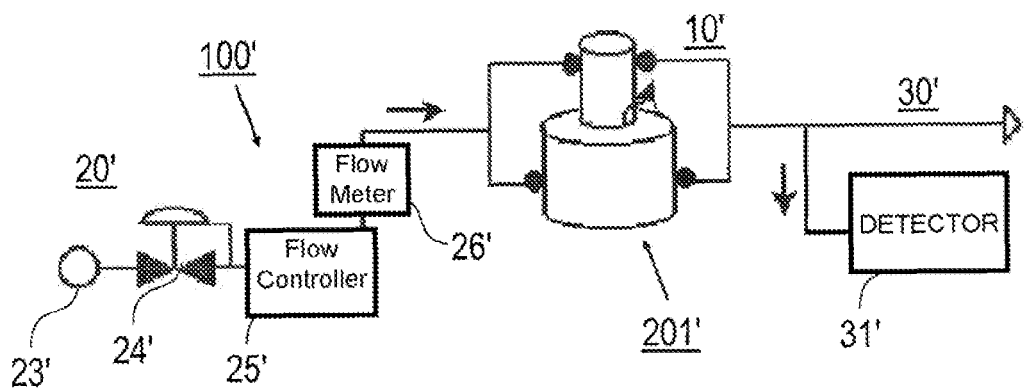
FIG. 17 shows a conventional apparatus for leak detection according to the flushing gas method.

FIG. 16 shows, in a schematic sectional view, an embodiment of the invention wherein the flushing device 10 has a covering 12 with a cylindrical form. An annular flushing chamber 11 is formed around the component 201 under test (round seam between two vacuum pipes). The flow unit 22.1 to which the system flow line 22 is attached and the sniffer probe 31.1 to which the detector line 31 is connected are movably arranged on the covering 12. Both components 22.1 and 31.1 can be moved round the component 201 with a drive unit 15. In particular, the sniffer probe 31.1 can be rotated round the component 201 in order to locate a leak.

The features of the invention disclosed in the above description, the drawings and the claims may be significant to the realization of the invention in its various embodiments either individually or in combination.

The invention claimed is:

1. A method for detecting a leak gas in a flushing device, comprising the steps:
arranging the flushing device on a component to be tested, generating a pre-determined main flow of a flushing gas,
dividing the main flow in a dividing device into a system flow, which is fed into the flushing device, and a partial flow,
setting a pre-determined volume flow rate for the partial flow by providing a pre-determined flow resistance in a partial flow line of the dividing device, said pre-determined flow resistance being provided by adjusting at least one variable selected from the group consisting of a diameter of the partial flow line, a length of the partial flow line, and an adjustable variable of a partial flow adjusting device in the partial flow line,
passing the flushing gas through the flushing device, and detecting of the leak gas in the flushing gas which emerges from the flushing device with a detector device.

2. The method according to claim 1, wherein the partial flow adjusting device in the partial flow line is adjusted manually or with a differential pressure manometer.

3. The method according to claim 1, wherein the partial flow is adjusted depending on a pressure in the flushing device or in the detector device.

4. The method according to claim 1, further comprising the step of setting a pre-determined volume flow rate for the main flow with a main flow adjusting device.

5. The method according to claim 4, wherein the main flow is adjusted with at least one measure selected from the group consisting of pressure adjustment, cycle adjustment and flow adjustment.

6. The method according to claim 4, wherein the main flow is adjusted depending on a pressure in the flushing device or in the detector device.

7. The method according to claim 1, further comprising the step of calibration of the detector device.

8. The method according to claim 7, wherein during the calibration, the flushing gas is fed directly to the detector device without passing through the flushing device.

9. The method according to claim 8, wherein the calibration comprises an injection of a calibration gas into the flushing gas.

10. The method according to claim 9, wherein at least one measure selected from the group consisting of syringe injection, test leak injection, injection by way of a lifting valve and pump injection is provided for the injection.

11. The method according to claim 7, wherein during the calibration, a calibration flow is passed to the detector device.

12. The method according to claim 11, wherein the calibration flow is provided with a calibration flow dividing device.

13. The method according to claim 1, wherein the detector device generates a negative pressure under the effect of which the system flow is drawn through the flushing device.

14. A leak detection apparatus for detecting a leak gas in a flushing device, comprising:
a gas feed device for conducting a flushing gas through the flushing device, wherein the gas feed device comprises a dividing device comprising a T-piece for dividing a pre-determined main flow of the flushing gas into a system flow fed to the flushing device through a system flow line and a partial flow through a partial flow line, and
a detector device for detecting the leak gas in the flushing gas that emerges from the flushing device.

15. The leak detection apparatus according to claim 14, wherein the T-piece comprises a partial flow chamber from which the system flow line and the partial flow line branch off.

16. The leak detection apparatus according to claim 15, wherein the partial flow chamber comprises a throttle device at the branching off of the system flow line.

17. The leak detection apparatus according to claim 14, wherein the partial flow in the partial flow line is adjustable by way of at least one measure selected from the group consisting of provision of a pre-determined diameter of the partial flow line, provision of a pre-determined length of the partial flow line and adjustment of a partial flow adjusting device.

18. The leak detection apparatus according to claim 17, wherein the partial flow adjusting device can be adjusted manually, magnetically cycled or with a differential pressure manometer.

19. The leak detection apparatus according to claim 17, wherein the main flow adjusting device is adjustable manually or with a differential pressure manometer.

20. The leak detection apparatus according to claim 14, wherein the gas feed device comprises a main flow adjusting device for adjusting the main flow.

21. The leak detection apparatus according to claim 20, wherein the main flow adjusting device is configured for at least one measure selected from the group consisting of pressure adjustment, cycle adjustment and flow adjustment.

22. The leak detection apparatus according to claim 21, wherein a first control circuit is provided, with which the main flow adjusting device is controllable depending on a pressure in the flushing device or in the detector device.

23. The leak detection apparatus according to claim 14, wherein a second control circuit is provided, with which the partial flow adjusting device is controllable depending on a pressure in the flushing device or in the detector device.

24. The leak detection apparatus according to claim 14, comprising a calibration device for calibrating the detector device.

25. The leak detection apparatus according to claim 24, wherein the calibration device comprises a calibration source, from which a calibration flow can be conducted to the detector device.

26. The leak detection apparatus according to claim 14, wherein the gas feed device has a bypass, via which the system flow of the flushing gas can be fed directly to the detector device without passing through the flushing device.

27. The leak detection apparatus according to claim 14, comprising an injection device for injecting a calibration gas into the system flow, or a flushing gas covering.

28. The leak detection apparatus according to claim 27, wherein the injection device is connected to the dividing device or the flushing device.

29. The leak detection apparatus according to claim 27, wherein the injection device comprises at least an injection syringe, a test leak, a lifting valve or a pump.

30. The leak detection apparatus according to claim 14, wherein the dividing device comprises a closure for closing the partial flow line or other open lines relative to a surrounding atmosphere.

31. The leak detection apparatus according to claim 14, wherein the flushing device is part of the leak detection apparatus.

32. The leak detection apparatus according to claim 31, wherein the flushing device is equipped with a tempering device.

33. The leak detection apparatus according to claim 31, wherein the flushing device comprises a covering with a cylindrical shape.

34. The leak detection apparatus according to claim 14, wherein the gas feed device comprises a flow unit which opens into a flushing chamber enclosed by the flushing device.

35. The leak detection apparatus according to claim 34, wherein the flow unit and/or a sniffer probe is movably arranged on the flushing device.

36. The leak detection apparatus according to claim 35, wherein the flow unit and/or the sniffer probe is rotatably arranged around a component to be tested.

37. The leak detection apparatus according to claim 14, wherein the detector device comprises a sniffer probe which is connected via a detector flow line to a detector.

* * * * *